Figure 1:
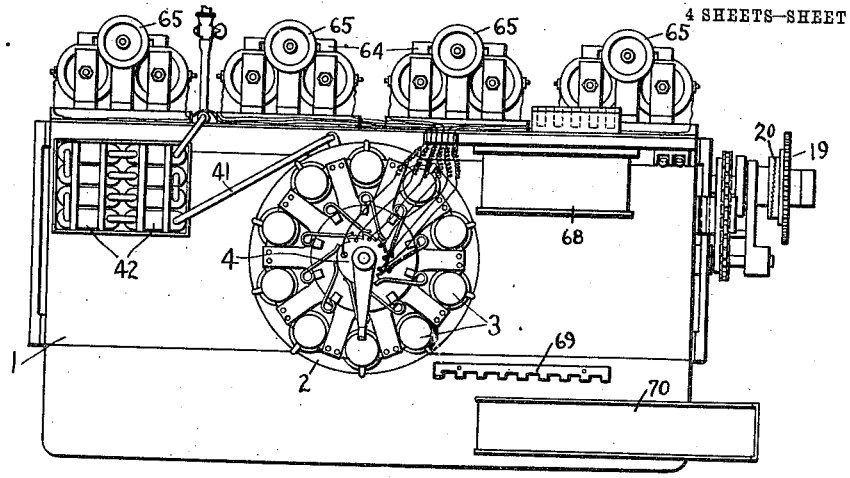

J. W. HOWELL.
FORMING MACHINE FOR TUNGSTEN FILAMENTS.
APPLICATION FILED MAY 7, 1908.

1,062,281.

Patented May 20, 1913.

4 SHEETS—SHEET 1.

Witnesses:
Irving E. Steers.
J. Ellis Glen

Inventor
John W. Howell,
by Albert H. Davis
Att'y

J. W. HOWELL.
FORMING MACHINE FOR TUNGSTEN FILAMENTS.
APPLICATION FILED MAY 7, 1908.
1,062,281.
Patented May 20, 1913.
4 SHEETS—SHEET 2.
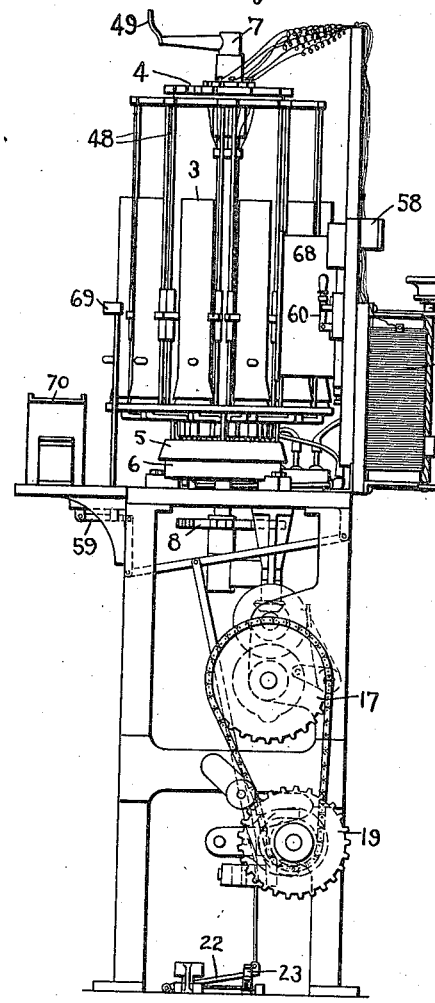
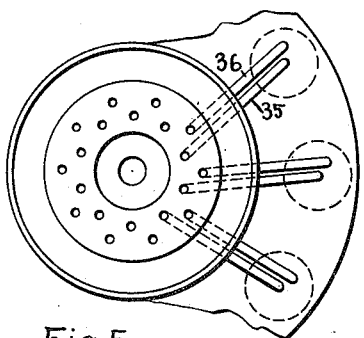
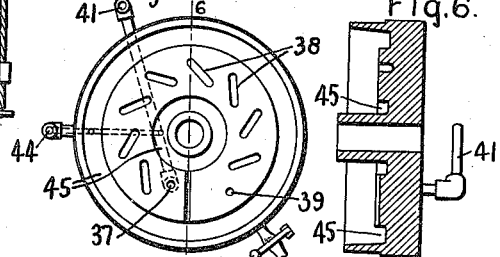
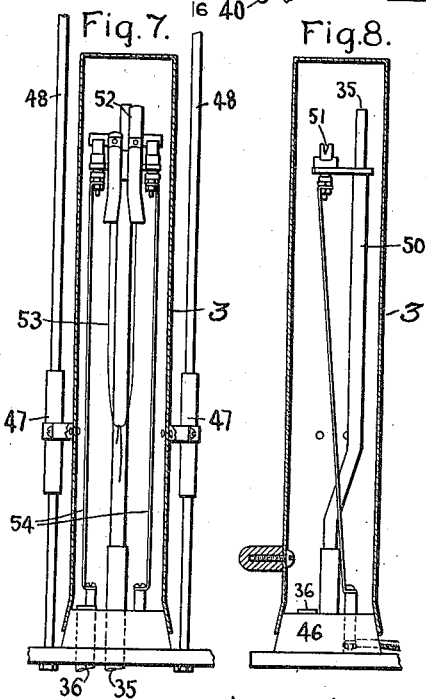
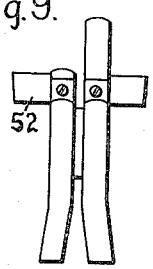
Witnesses:
Irving Esters
J. Ellis Elen
Inventor
John W. Howell,
by
Att'y.

J. W. HOWELL.
FORMING MACHINE FOR TUNGSTEN FILAMENTS.
APPLICATION FILED MAY 7, 1908.
1,062,281.
Patented May 20, 1913.
4 SHEETS—SHEET 3.
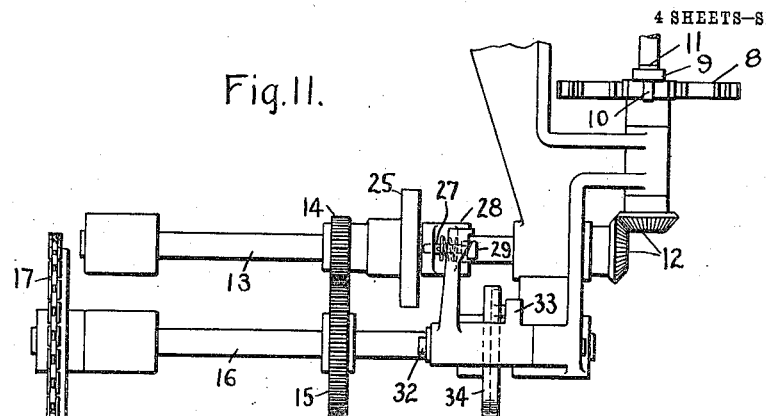
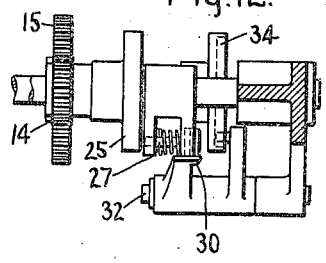
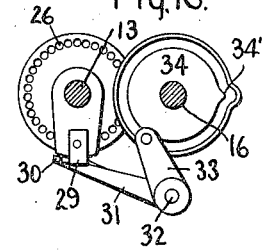
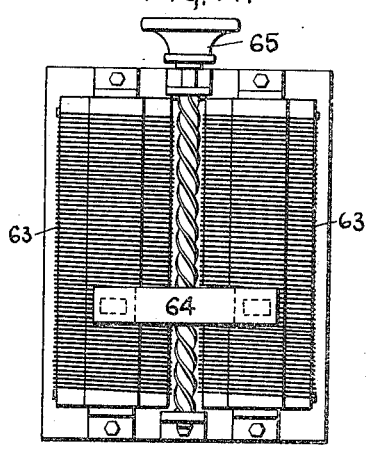
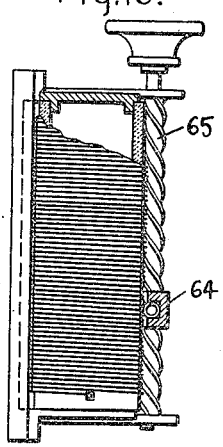
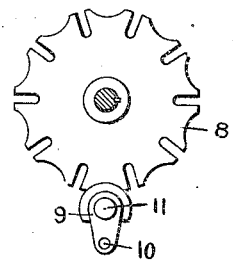
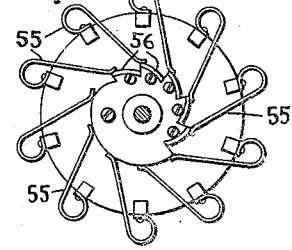
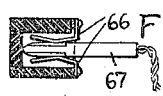
Witnesses:
Irving Esters
J. Ellis Ellen
Inventor
John W. Howell,
by Albert G. Davis
Att'y.

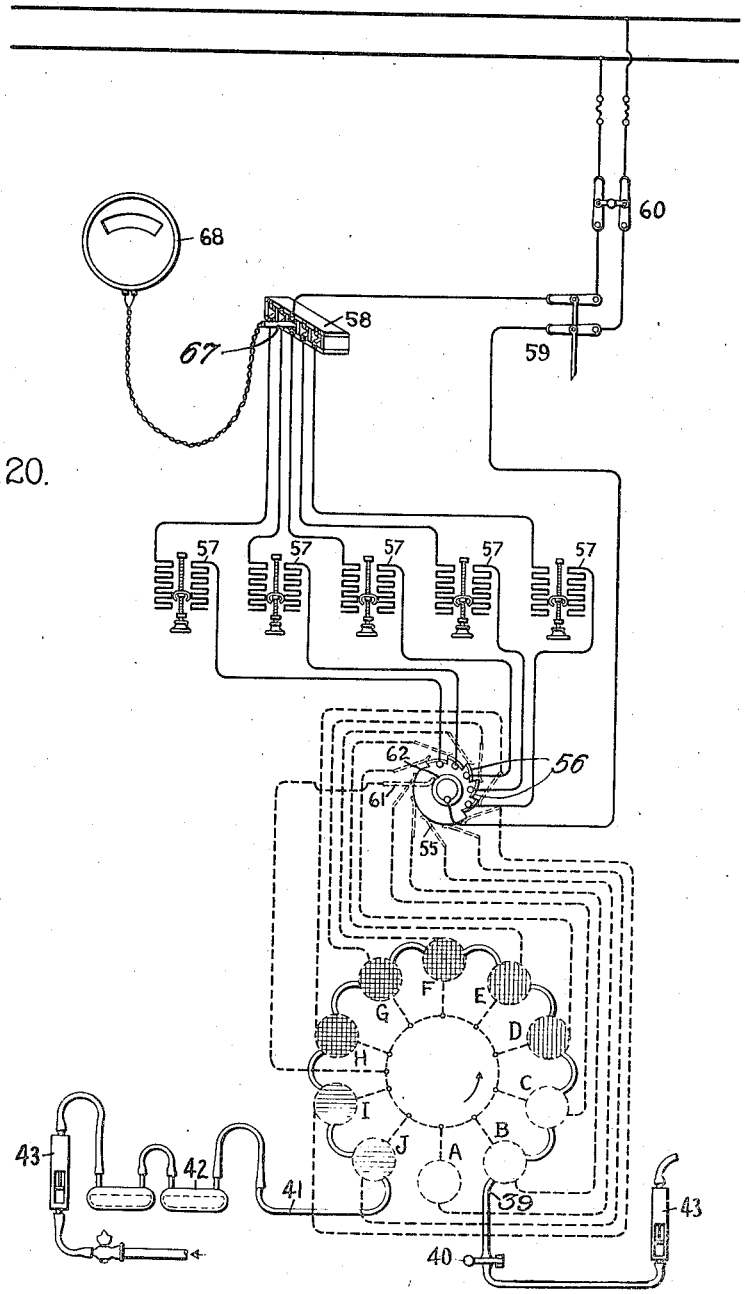

UNITED STATES PATENT OFFICE.

JOHN W. HOWELL, OF NEWARK, NEW JERSEY, ASSIGNOR TO GENERAL ELECTRIC COMPANY, A CORPORATION OF NEW YORK.

FORMING-MACHINE FOR TUNGSTEN FILAMENTS.

1,062,281. Specification of Letters Patent. Patented May 20, 1913.

Application filed May 7, 1908. Serial No. 431,323.

*To all whom it may concern:*

Be it known that I, JOHN W. HOWELL, a citizen of the United States, residing at Newark, county of Essex, State of New Jersey, have invented certain new and useful Improvements in Forming-Machines for Tungsten Filaments, of which the following is a specification.

My invention relates to machines for making incandescent lamps, and more particularly to machines for reducing, purifying and sintering filaments made of refractory material, such as tungsten, and requiring comparatively prolonged heating in an atmosphere of definite chemical composition. This process of reducing, purifying and sintering is called "forming".

Incandescent lamp filaments of refractory metal, such as tungsten, are often prepared by mixing the powdered material with some binder to produce a plastic mass which is shaped and then rendered partially conducting by being heated at a high temperature in a suitable atmosphere. The carbonized filament is then kept in a reducing atmosphere and heated by passing a current of electricity through it until the carbon is completely removed and only the pure tungsten or other refractory metal remains.

The object of my invention is to provide a simple and easily operated machine in which the filaments can be formed rapidly and accurately by unskilled labor and in which no skill on the part of the operator is required in order to maintain the proper atmosphere around the filaments and to secure the proper heating of the filaments.

In carrying out my invention a plurality of forming receptacles are mounted on a carrier which is moved intermittently and holds each receptacle stationary in front of the operator long enough to permit the removal of the finished filament and the insertion of a raw filament. The movement of the carrier automatically controls the connections of the receptacles to the source of supply of the forming gas which constitutes the reducing atmosphere, and simultaneously controls the amount of current flowing through the filaments to heat them to the required degree. The machine is preferably arranged to cause the forming gas to flow through the receptacle in succession when the carrier is stationary, while the electrical connections through the filaments are broken and the supply of forming gas is cut off during the movement of the carrier from one position to another. The only duty of the operator is to remove and replace filaments, and in order to facilitate the operator's work as much as possible the forming receptacles are preferably made so they may be easily raised to leave the filament supports and clamps easily accessible. The amount of current flowing through any filament may be varied independently of the other filaments by changing an adjustable resistance in series with it, and an ammeter arranged to show the amount of current in any desired filament is provided to enable complete control of the operations to be maintained.

My invention will best be understood in connection with the accompanying drawings, which are merely illustrative of one form in which the invention may be embodied and in which—

Figure 2:
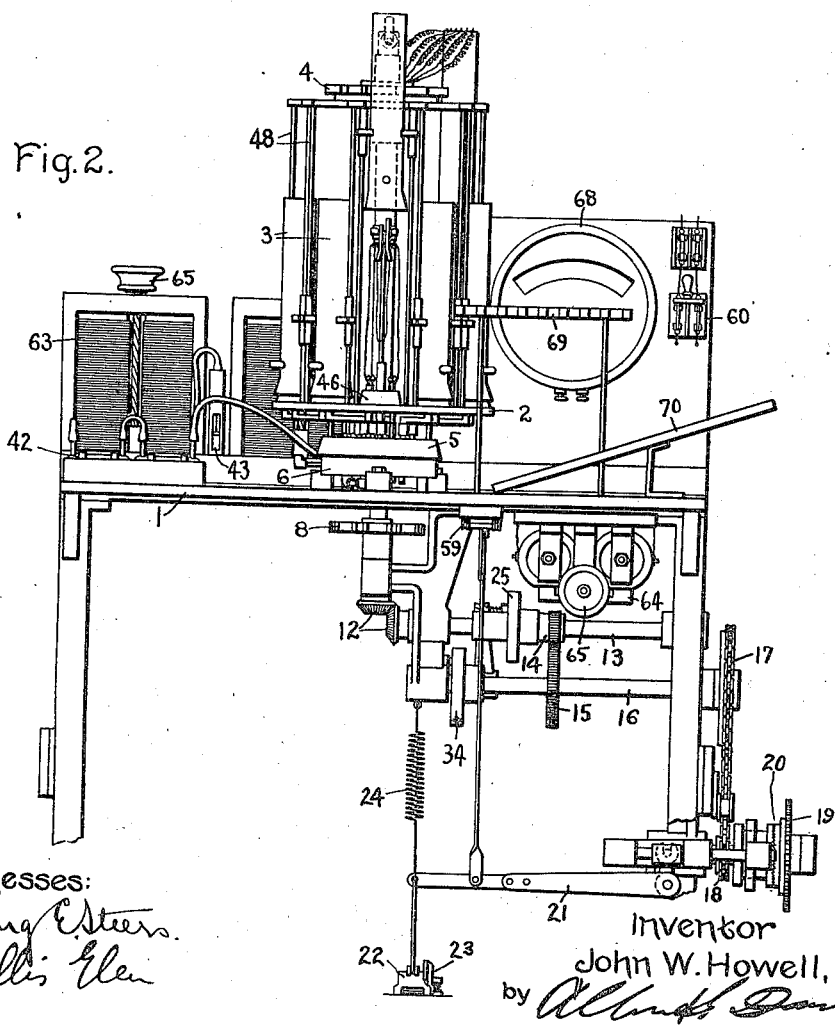

Figure 1 is a top plan view of the machine, looking downward upon the table or top of the machine; Fig. 2 is a front elevation of the machine shown in Fig. 1 with one of the receptacles raised to expose the filament; Fig. 3 is an end elevation with parts omitted to show the controlling mechanism; Fig. 4 is a bottom plan view of the revolving disk of the gas valve, showing the connections to the forming receptacles; Fig. 5 is a plan view of the stationary seat of the gas valve; Fig. 6 is a cross-section along the line 6—6 of the valve seat shown in Fig. 5; Fig. 7 is a section through one of the forming receptacles showing a filament in position for forming; Fig. 8 is a cross-section of a forming receptacle at right angles to the plane of Fig. 7; Figs. 9 and 10 are plan and side views respectively of the clamps for holding the filaments; Figs. 11, 12 and 13 are detail views of the intermittent gearing for giving a step by step movement to the forming receptacles; Figs. 14 and 15 are plan and side views of adjustable resistances for varying the heating current through the filaments; Fig. 16 is a plan view of the Geneva stop motion which moves the forming receptacles definite distances and holds them stationary between movements; Fig. 17 is a plan view of the automatic switch for controlling the heating current through the filaments; Figs. 18 and 19 are plan and sectional views respectively of the plug switch for cutting an ammeter into circuit with the filament in any of the forming receptacles; and Fig. 20 is a diagrammatic view showing the relations of the various parts of the machine.

In the specific form of machine shown in the drawings, the various elements are mounted upon a framework 1 having a top or table above which a movable carrier 2 is rotatably mounted and carries a plurality of forming receptacles 3 in which the filaments are heated in a reducing atmosphere. The flow of current through the filaments to heat them is controlled by an automatic switch 4 carried on and rotating with the movable carrier 2, while the supply of forming gas which furnishes the reducing atmosphere for the filaments is controlled by an automatic valve consisting of a rotary valve disk 5 moving with the carrier 2 and coöperating with a fixed valve seat 6 which has inlet and outlet ports for the forming gas. A stationary standard or support 7 carries part of the automatic switch 4, while the other part of the automatic switch, the carrier 2 and the valve disk 5 are moved from one position to the next and locked in each position by means of a gear 8 engaged by a pinion 9 carrying a pin 10 to enter radial slots in the gear 8, the whole forming a stop motion of the well-known Geneva type. The pinion 9 is mounted on and driven by a vertical shaft 11 connected through beveled gears 12 to a horizontal counter-shaft 13, on which a spur gear 14 is loosely mounted to mesh with a larger spur gear 15 mounted on and driven by a second counter-shaft 16 actuated by a sprocket 17 connected through a chain to a sprocket 18 which in turn is actuated from a driving gear 19 through a disengageable clutch 20. The driving gear 19 runs continuously and the machine is started and stopped by the clutch 20, which is controlled by a clutch lever 21 actuated by a pedal 22 under the control of the operator. A catch 23 normally holds the pedal in a position to cause the clutch to engage, and a spring 24 tends to move the pedal when the catch is released and thereby stop the machine.

The carrier 2 is given a step by step motion at definite intervals by means of any suitable intermittent gearing between the counter-shafts 13 and 16. The preferred form of intermittent gearing, shown in detail in Figs. 11, 12 and 13, comprises a clutch member 25, in the form of a disk rigidly connected to the spur gear 14 and having holes 26 near the periphery, which intermittently drives the counter-shaft 13 by means of a spring-pressed pin 27 arranged to enter one of the holes 26 and slidably mounted in a second clutch member 28 rigidly fastened to the shaft 13. As long as the pin 27 is in one of the holes 26, the two clutch members are locked together, and the counter-shaft 16 drives the counter-shaft 13 through the gears 14 and 15.

Intermittent motion is imparted to the counter-shaft 13 by automatically disconnecting the clutch members 25 and 28 after each revolution of the counter-shaft 13 by any suitable mechanism which moves the spring-pressed pin 27 out of the holes in the clutch member 25. In the specific arrangement shown in the drawings, the pin 27 has a head 29 with an inclined surface which coöperates with a cam 30 on the end of a controller arm 31 carried by a hub mounted on a fixed stud 32 and moved by an actuating arm 33 with a pin in the end to coöperate with the groove in a face cam 34 mounted on and driven by the counter-shaft 16. The parts are normally in such a position that the cam 30 holds the pin 27 out of engaging position, but when the swell 34' of the face cam engages the pin in the end of the actuating arm 33 the cam 30 moves out of engagement with the head of the pin 29, and permits the spring to force the pin into one of the holes 26, causing the counter-shaft 13 to revolve at a higher rate of speed than the counter-shaft 16. Before the counter-shaft 13 completes one revolution the pin on the end of the actuating arm 33 travels into the concentric part of the groove in the face cam and moves the cam 30 back into a position where, at the end of the revolution of the counter-shaft 13, the cam engages the inclined surface on the head 29 of the pin 27 and forces the pin out of engagement with the clutch member 25, thereby stopping the rotation of the counter-shaft 13, which remains stationary until the counter-shaft 16 completes its revolution and by again throwing the cam 30 out of engaging position permits the pin 27 to engage the clutch member 25. As a result of this construction the counter-shaft 13 makes one revolution at a considerably higher speed than the counter-shaft 16 and then remains stationary until the revolution of the counter-shaft 16 is completed.

An atmosphere of forming gas, consisting of nitrogen and hydrogen, is maintained about the filaments during the time they are being heated and formed. The supply of forming gas may be delivered to each receptacle in any suitable way, but in the preferred arrangement the forming receptacles containing the filaments are connected in such a manner that a stream of forming gas flows from the receptacle containing a finished filament through the receptacles one after another and is finally discharged from the treating receptacle containing the raw filament last placed in the machine. The forming gas enters each receptacle through an inlet pipe 35 and escapes through an outlet pipe 36, both of these pipes being connected to ports in the valve disk 5 in the manner shown in Fig. 4. The forming gas is supplied to the treating receptacles through a supply port 37 in the valve seat 6, shown in Fig. 5, and is led through the receptacles by means of a series of bridging ports 38 in the valve seat 6 arranged to coöperate with the ports in the valve disk 5 and connect the outlet and inlet pipes of the receptacles to form a channel through which the gas can flow from one receptacle to the next, with the outlet pipe of the last receptacle connected to an outlet port 39 in the valve seat 6. The pressure of the gas in the receptacles may be controlled in any suitable way, preferably by varying the back pressure at the outlet port by means of a throttle valve or pinch cock 40, thereby insuring a pressure above atmosphere in each receptacle and overcoming the effect of any leaks in the valve or receptacles. The course of the forming gas through the treating receptacles is best shown in Fig. 20, in which the parts that move are shown in dotted lines and in which the receptacle at A is in the loading position, while the receptacle at B containing a raw filament is connected to the outlet port 39 and also to the supply port 37 through the other receptacles between it and the receptacle at J which contains a finished filament, and receives the forming gas from the supply port 37 connected to a supply pipe 41, purifying cells 42 containing sulfuric acid, and a flow indicator 43. The valve is packed by oil introduced by an oil pipe 44 into concentric grooves 45 near the center and the circumference of the valve seat 6, as shown in Fig. 5. As the valve disk 5 and the support 2 are intermittently shifted by the action of the intermittent gearing, the receptacles are moved step by step in the direction shown by the arrow in Fig. 20, and during each movement are entirely cut off from communication with each other and with the source or supply of the forming gas. As a result of this arrangement, the receptacle at B which contains a raw filament, is filled with forming gas which, passing through and acting on all of the filaments in the other receptacles, flows through B and washes out any air which entered the receptacles when it was opened at A. This washing action continues at C, so when position D is reached practically all the air is washed out and in this position the filament is first heated with current. A flow indicator 43 connected to the outlet port 39 enables the operator to control very accurately the amount of gas flowing through the receptacles.

In order to facilitate the operator's work in removing and replacing filaments, each receptacle is preferably made to swing back out of the way to afford free access to the filament. In the particular arrangement shown in the drawings, the forming receptacle 3 is made in the form of an inverted cylinder open at the bottom and coöperating with a closure 46 of rubber or similar material which forms part of the filament holder and makes an air-tight joint with the lower edge of the receptacle. Each receptacle, which has guides 47 in engagement with the two guide rods 48 mounted on the movable carrier 2 can be raised to the position shown in Fig. 2, where it is caught and held by the spring catch 49 mounted on the standard 7 and arranged to hold the receptacle in such a position that the filament can be easily reached by the operator.

The filament is carried in proper position in the forming receptacle by a filament holder comprising the closure 46 and a standard 50, provided with two notched sockets 51 insulated from each other and shaped to engage and hold lugs on the filament clamps 52, which engage the ends of the filaments 53, as shown in Fig. 7, and are made of metal to lead the heating current through the filament while it is being formed. The current is supplied to the clamps and the filament through leads 54, one of which is connected to a brush 55 mounted on and movable with the carrier 2, as shown in Figs. 17 and 20, and in engagement with a series of contacts 56 mounted on the stationary part of the automatic switch 4. The contacts 56 are connected through an adjustable resistance 57, plug switch box 58, a switch 59 controlled by the pedal 22, and a hand switch 60 to one side of the supply circuit, while the other lead 54 in each receptacle is connected to the other side of the circuit through a brush 61, which is mounted on the carrier 2 to engage a stationary slip ring 62 connected through the switches 59 and 60 to the supply circuit. As a result of these connections, the current flows through the filament in each forming receptacle as long as the brush 55 corresponding to that receptacle is in engagement with one of the stationary contacts 56, and the amount of current through the filament in each position is determined by the amount of resistance 57 in series with the contact 56 corresponding to that position. In the machine shown five separate circuits are used to heat the filaments and are adjusted to give the smallest current in the first position and the greatest current in the last position, the filament being progressively transferred from one circuit to the next. I also contemplate maintaining each filament in an uninterrupted circuit until the forming of the filament is complete, the required variations in temperature being secured by automatically varying the amount of current in the circuit. The stationary part of the switch 4, as shown in Figs. 17 and 20, is in the form of an insulating disk, and the stationary contacts 56 are arranged in the form of ratchet teeth over which the brushes 55 slide like pawls. This arrangement insures a sliding contact between the brush 55 and the contact 56 and also insures a quick break of the circuit through the filament as the brush snaps from one contact to the next.

In the machine shown in the drawings, five fixed contacts are provided, and as a result five filaments are being heated during the operation of the machine. As shown in Fig. 20 the filaments in the receptacles in positions D, E, F, G and H are subjected to the heating current while the filaments in receptacles B, C, I and J do not receive current.

The amount of current flowing through the filament in each position of the carrier 2 can be independently regulated by means of the adjustable resistances 57, which, as shown in Figs. 14 and 15, consist of two coils 63 of resistance wire wound on any suitable support and connected by a bridging piece 64 shifted by an adjusting screw 65 to vary the resistance in the circuit. In order to enable the operator to calibrate the resistances 57 and determine the proper amount of current flowing through the filaments, the leads from all of the resistances pass into a plug switch box shown more in detail in Figs. 18 and 19, and which consists of an insulating box containing as many pairs of flexible contacts 66 as there are circuits through the filaments in the treating machine. The spring contacts 66 are normally in engagement with each other to close the circuit through the filaments, but if it is desired to test any circuit, a testing plug 67 made of insulation and having contacts on opposite sides is inserted between the two contacts 66 in the circuit to be tested, and in this manner an ammeter 68 is connected in series in the circuit and enables the operator to determine the exact amount of current flowing through the filament.

The operator is provided with a number of filament clamps and a rack 69, as shown in Fig. 2, is provided for the purpose of holding the clamps which carry the filaments ready for insertion in the treating receptacles, while a second rack 70 provides a convenient place for keeping the clamps from which the filaments have been removed.

The operation of the device is as follows: The operator raises the receptacle 3 to the position shown in Fig. 2 and thereby exposes the standard 50 with the recessed blocks or sockets 51 connected to the leads 54. A clamp 52 with a filament attached thereto is placed on the standard 50 with the lugs on the clamp in engagement with the recessed blocks 51 and therefore in electrical connection with the leads 54, and the treating receptacle 3 is then moved down into air-tight engagement with the closure 46, as shown in Fig. 7. In the succeeding operations, which are best understood from Fig. 20, the receptacle with the filament therein is moved one step in the direction of the arrow in Fig. 20 by the action of the intermittent gear, and comes into position B with its outlet pipe connected to the outlet port 39 and its inlet pipe connected to the outlet pipe of the preceding receptacle. The forming gas, heated in the preceding receptacles, flows through the receptacle and washes out any air which may be in the receptacle. After a predetermined time has elapsed, the intermittent gear again moves the carrier one step in the direction of the arrow and the receptacle is carried to position C, where it forms one of the series of receptacles through which the current of forming gas flows and becomes filled with an atmosphere free from oxygen. The next movement of the carrier 2 shifts the receptacle into position D where it again forms one of the series of receptacles through which the gas is flowing and at the same time the filament is connected in circuit to receive the heating current on account of the brush 55 connected to this receptacle coming into engagement with one of the fixed contacts 56 on the automatic switch. During the next five movements of the carrier 2, the filament is heated by a current which is larger at each successive position, the amount of current at each position being determined by the adjustable resistance 57 corresponding to that position. In the first two positions any oxid in the filament is reduced to metal and any carbon is removed, while in the remaining positions the filament is sintered and consolidated. When the receptacle moves from position H through positions I and J the gas continues to flow through it, but the filament is cut off from the heating current and cools down in a reducing atmosphere which prevents any oxidation. The receptacle and its contents cool sufficiently to allow safe opening and handling while passing through these two positions to position A, where the operator is stationed. When the receptacle has completed the circuit and returns to position A, it is cut off both from the supply of gas and from the current through the filament, the operator lifts the receptacle 3 into the position shown in Fig. 2, removes the completed filament, and replaces it with a raw filament. The operator removes and replaces the filaments from each forming receptacle as it stops in position A, and the operation above described is repeated.

If the operator desires at any time to adjust the amount of heating current flowing through the filament in any position, the attaching plug 67 is inserted between the proper contacts in the plug switch box 58 and the reading is secured on the ammeter 68. The amount of current can be changed to suit the requirements by means of the adjustable resistances 57.

My invention may be embodied in many other forms than that shown and described, and I therefore do not wish to be restricted to the exact form shown but intend to cover by the appended claims all changes and modifications within the spirit and scope of my invention.

What I claim as new and desire to secure by Letters Patent of the United States, is,—

1. In a filament machine, the combination of a plurality of receptacles for filaments, connections whereby a stream of fluid may be passed through said receptacles, and controlling means for varying said connections to cause the fluid to traverse only a portion of said receptacles and to cause each receptacle in turn to form one of the number which is traversed by the fluid.

2. In a filament machine, the combination of a plurality of receptacles for filaments, connections whereby a stream of fluid may be passed through said receptacles, and controlling means for varying said connections to cause a stream of fluid to flow through some of said receptacles, and to make each receptacle in turn one of those through which the stream of fluid flows.

3. In a filament machine, the combination of a plurality of receptacles for filaments, connections whereby a stream of fluid may be passed through said receptacles, and controlling means for varying said connections to pass a stream of fluid through some of said receptacles and to disconnect one receptacle from the stream of fluid and simultaneously connect another receptacle to said stream, whereby the number of receptacles traversed by the stream of fluid remains constant.

4. In a filament machine, the combination of a plurality of receptacles for filaments, connections whereby a stream of fluid may be passed through said receptacles, and means for varying said connections to cause each receptacle in turn to form one of a number less than the whole and traversed in succession by a stream of fluid and then in turn to be disconnected from the stream of fluid.

5. In a filament machine, the combination of a plurality of receptacles for filaments, means for moving said receptacles in a circular path, connections whereby a stream of fluid may be passed through said receptacles in succession, and controlling means for varying said connections to cause the stream of fluid to flow in succession through a part of said receptacles and for cutting off the remainder of said receptacles from the stream of fluid.

6. An apparatus for treating filaments comprising a plurality of filament receptacles, means for maintaining a flow of fluid through a series consisting of part of said receptacles, and means for heating the filaments in some of said receptacles while the fluid is flowing through them.

7. An apparatus for treating filaments comprising a plurality of filament receptacles, means for maintaining a flow of fluid through a series consisting of part of said receptacles, and means for passing current through the filaments in some of the intermediate receptacles of the series.

8. An apparatus for treating filaments comprising a plurality of filament receptacles, means for maintaining a flow of fluid through a series consisting of part of said receptacles, controlling means for varying said connections to cause each receptacle in turn to pass through the series from first to last successively, and means for passing current through the filament in each receptacle while said receptacle is intermediate in the series.

9. An apparatus for treating filaments comprising a plurality of filament receptacles, means for maintaining a flow of fluid through a series of said receptacles, controlling means for varying said connections to cause each receptacle in turn to pass through the series from first to last successively, and automatic means for passing current through the filaments of some of the intermediate receptacles only and thereby cause the end receptacles of the series to be traversed by fluid while no current is passing through the filaments in them.

10. In a filament machine, the combination of a plurality of filament receptacles, connections for maintaining a flow of fluid through a part of said receptacles in succession, and means actuated in timed relation to said controlling means for successively connecting the filament in each receptacle to different circuits while each receptacle is traversed by the current of fluid.

11. In a filament machine, the combination of a plurality of filament receptacles, connections for causing a stream of fluid to traverse a portion of said receptacles in succession, a plurality of independent electric circuits for supplying different amounts of current to a filament, and means for connecting each filament to each of said circuits in succession while the receptacle containing the filament is traversed by the fluid.

12. In a filament machine, the combination of a plurality of filament receptacles, means for moving said receptacles in a circular path, connections for causing a part of said receptacles to be traversed by fluid, independent electric circuits less in number than the number of receptacles traversed by fluid, means for varying the current in each circuit independently of the others, and means for connecting the filament in each of said receptacles to each of said circuits in succession while said receptacle is being traversed by fluid.

13. In a filament machine, the combination of a plurality of filament receptacles, means for moving said receptacles in a circular path, connections for causing a stream of fluid to traverse some of said receptacles while moving through a certain fraction of their path, a plurality of leads connected to one side of a circuit, an adjustable resistance in each lead, and means dependent on the movement of said receptacles for automatically connecting the filament in each of said receptacles to the other side of said circuit and to each of said leads in succession while the receptacle is moving through said fraction of its path.

14. In a filament machine, the combination of a rotatable carrier, a plurality of filament receptacles mounted on said carrier, means controlled by said carrier for causing fluid to flow through a part only of said receptacles, and automatic means actuated by said carrier for heating the filaments in a part only of the receptacles traversed by fluid and during the time said receptacles are traversed by the fluid.

15. In a filament machine, the combination of a rotatable carrier, a plurality of filament receptacles mounted on said carrier, means controlled by said carrier for heating the filaments in some of said receptacles, and automatic means controlled by said carrier for passing a stream of fluid through said receptacles, while the filaments in said receptacles are being heated and while the filaments are being cooled.

16. In a filament machine, the combination of a movable carrier, a plurality of filament receptacles mounted thereon, connections whereby a stream of fluid may be passed in succession through those receptacles which are between predetermined points in their path of movement, the distance between said points being only a fraction of the travel of each receptacle, a valve actuated by said carrier to pass fluid through said receptacles successively during their travel between said points, and automatic means controlled by said carrier for heating the filament in each receptacle during its travel between points intermediate said predetermined points.

17. In a filament machine, the combination of a rotatable carrier, a plurality of filament receptacles mounted on said carrier, means controlled by said carrier for causing fluid to traverse a part of said receptacles in succession while the remainder of said receptacles are cut off from the supply of fluid, and automatic means controlled by said carrier for heating the filaments in a part of those receptacles which are traversed by fluid.

18. In a filament machine, the combination of a filament receptacle having an inlet and outlet, means for supplying the inlet of said receptacle with a fluid under substantially constant pressure, and means for throttling at will the outlet of said receptacle to vary the pressure of fluid within said receptacle.

19. In a filament machine, the combination of a plurality of filament receptacles, means for passing fluid through said receptacles in succession to a common outlet, and means for throttling said common outlet to vary the pressure within all of said receptacles.

20. In a filament machine, the combination of a filament receptacle, means for supplying said receptacle with fluid under pressure, a distributing valve for admitting fluid to and releasing fluid from said receptacle, and means for at will partially obstructing the escape of fluid from said valve to vary the pressure within said receptacle.

21. In a filament machine, the combination of a plurality of filament receptacles each having an inlet and an outlet, means for connecting said receptacles to a source of fluid under pressure to cause fluid to flow through them in succession, and means for at will partially obstructing the escape of fluid from said receptacles to control the pressure of the fluid within said receptacles.

In witness whereof, I have hereunto set my hand this 4th day of May, 1908.

JOHN W. HOWELL.

Witnesses:
J. HARRY ELKINS,
C. R. O'NEAL.